United States Patent [19]
Janiszewski et al.

[11] Patent Number: 5,309,609
[45] Date of Patent: May 10, 1994

[54] CLIP-ON RETAINER

[75] Inventors: Joseph L. Janiszewski, Berkley; John E. Kajander, Ypsilanti, both of Mich.

[73] Assignees: Industrial Machine Products, Oxford; Ford Motor Co., Dearborn, both of Mich.

[21] Appl. No.: 71,849

[22] Filed: Jun. 7, 1993

[51] Int. Cl.5 .............................................. A44B 21/00
[52] U.S. Cl. ........................................ 24/339; 24/338; 24/545
[58] Field of Search ................. 24/339, 338, 337, 336, 24/545, 10 R, 10 A, 11 R, 129 A; 403/391, 397; 248/229

[56] References Cited

U.S. PATENT DOCUMENTS

| | | | |
|---|---|---|---|
| 501,392 | 7/1893 | Wiedenmann | 24/336 |
| 1,014,009 | 1/1912 | Koons | 24/339 |
| 1,891,431 | 12/1932 | Markart | 24/339 |
| 3,140,069 | 7/1964 | McBurney et al. | 248/229 |
| 3,206,086 | 9/1965 | Duffney | 24/339 |
| 3,475,716 | 10/1969 | Laig | 24/339 |
| 3,609,638 | 9/1971 | Dar | 24/339 |
| 3,769,663 | 11/1973 | Perl | 24/339 |

FOREIGN PATENT DOCUMENTS 0143018  5/1920  United Kingdom ................. 24/339

Primary Examiner—Victor N. Sakran
Attorney, Agent, or Firm—Krass & Young

[57] ABSTRACT

An improved spring clip retainer for a telescopic coupling such as the coupling between a fuel filter and a fuel line. The retainer comprises a first pair of opposed spring fingers which grasp and hold the male portion of the coupling and a second pair of opposed spring fingers which grasp and hold a longitudinally spaced portion of the female coupling element. The second set of fingers are longer than the first and are provided with a self-aiming, one-way latch which is readily operated by squeezing the longer fingers toward one another after association with the small diameter female fuel line coupling component. Through this operation the retainer can be effectively permanently associated with a fuel line subassembly which is joined to the fuel filter in a subsequent operation.

4 Claims, 2 Drawing Sheets

CLIP-ON RETAINER

INTRODUCTION

This invention relates to clip-on retainers of the type used to prevent the inadvertent separation of a telescopic coupling. The invention provides an improvement to such clip-on retainers whereby the retainer is more securely fastened to one of the two coupled elements during preassembly shipping and handling.

BACKGROUND OF THE INVENTION

Male/female telescopic couplings are commonly used in fluid conduits such as the fuel line of an automotive vehicle; e.g., such a coupling is commonly found between the fuel line and the fuel filter. A characteristic of the coupling is a male component having a circumferential bead near the end and which fits telescopically into a female component of larger diameter. To prevent inadvertent separation a retainer clip is used to bridge the coupling. A prior art retainer clip comprises two sets of opposed resilient fingers spaced apart by a rigid integral bridge section of sufficient length that one set of fingers grasps the male component near the bead and the other set of fingers grasps the female component on the opposite side of the coupling. The coupling is, therefore, trapped between the two sets of retainer fingers and cannot be uncoupled.

Typically the clip-on retainer is attached to the female coupling component sometime prior to its engagement with the male coupling component; in fact, the combination of the fuel line with the female coupling component and the clip-on retainer may be shipped and handled several times before final assembly. During this time it is possible for the prior art clip-on retainer to become separated from the fuel line subassembly, thus requiring a supplementary supply of clip-on retainers at the assembly site.

BRIEF SUMMARY OF THE INVENTION

The present invention solves the aforementioned problem of inadvertent separation of the clip-on retainer from the subassembly. In general, this problem is solved through the provision of a self-aiming, one-way latch which is readily operated to mechanically lock or latch the ends of one of the sets of opposed compliant fingers; i.e., the set which grasps the female coupling elements during shipping and handling. The self-aiming, one-way latch may be activated simply by squeezing the compliant fingers toward one another after the clip-on retainer is properly located on the female element.

As hereinafter explained and described in greater detail, the self-aiming, one-way latch mechanism may be realized in any of several physical arrangements, the preferred arrangement consisting of a pair of spaced apart and bent back tangs on the ends of one of the two opposed fingers and a T-shaped head formed on the end of the other of the two fingers. When the T-head is urged toward the bent back tangs, the tangs operate as a camming mechanism to automatically aim and direct the T-head over the bent back tangs. After the top of the T-head has cleared the tangs, it snaps into position behind the tangs. Releasing pressure on the two compliant opposed fingers causes the top of the T to position itself securely behind the tangs where it is held against disengagement.

The aforedescribed operation can be achieved with and without tools and the clip latch can be disengaged for subsequent repair and/or replacement of components associated with the fluid coupling.

The invention is hereinafter described with respect to a preferred embodiment having a first clip portion which is made up of first and second opposed compliant fingers adapted to receive and grasp the male component therebetween, a second clip portion made up of third and fourth compliant fingers adapted to receive and grasp the female component therebetween, the first and second clip portions being integrally joined by means of a bridge portion which is typically configured in such a fashion as to be essentially non-compliant. The third and fourth fingers are longer than the first and second fingers so that the third and fourth fingers exhibit two positions relative to the female coupling component; i.e., a first portion in which the coupling is farthest from the retainer bridge and a second position which is closer to the bridge. In the second position, the first and second fingers are also engaged with the male component of the coupling. The improvement provided by the subject invention is the self-aiming, one-way latch which is formed on the ends of the third and fourth fingers to permit those fingers to be opened for initial association of the clip with the female subassembly and then easily closed and latched together to prevent disassociation of the retainer from the female subassembly during shipping and handling.

DETAILED DESCRIPTION OF THE ILLUSTRATIVE EMBODIMENT

Figure 1:
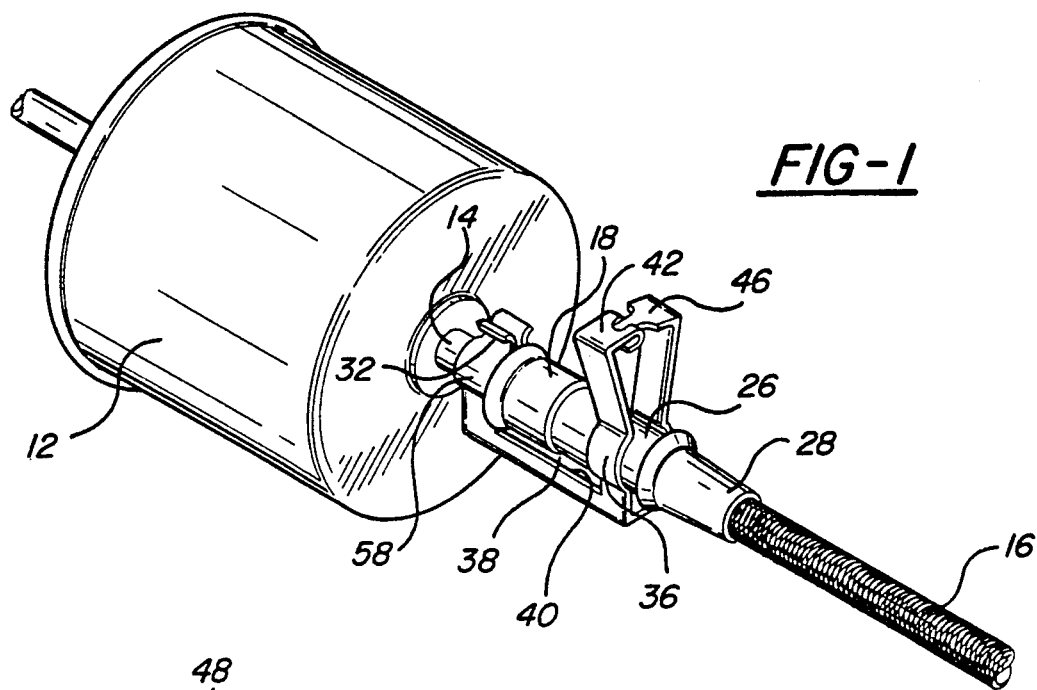
FIG. 1 is a perspective view of a fuel filter and fuel line assembly utilizing an illustrative embodiment of the inventive retainer.

Referring to FIG. 1, an illustrative industrial application of the invention is shown in the combination 10 of an automotive fuel line filter 12 having a small diameter male coupling component 14 extending therefrom for connection to an armored fuel line 16 which is mechanically integrally joined to a female coupling 18 of a type which is well known in the art; an illustrative coupling is manufactured by the Aeroquip Corporation of Jackson, Mich. The assembly further comprises a redundant backup clip-on retainer 20 hereinafter described in greater detail.

Completing the description of the assembly 10, the component 14 is provided near the end with a raised circumferential flange or bead 22 which, in the normal operative association with fuel line 16, is located inside of the bell-shaped housing 24 which, from an external structural standpoint, is the principal component of the female coupling component 18. The bell-shaped housing is joined to a smaller diameter section of the fuel line 26 and thereafter to a larger diameter flared section 28 for purposes which will be apparent upon description of the function of the backup retainer 20.

The clip-on retainer 20 comprises a pair of first and second resilient or compliant fingers 30 and 32 which are configured and sized to grasp the male coupling component 14 therebetween. Retainer 20 further comprises a second set of longer fingers 34 and 36 which are configured to grasp the smaller diameter section 26 of the female subassembly therebetween and an integral bridging portion 38 which is preferably rigidified by the formation of upstanding edge flanges 40 as shown. The fingers 30,32 are spaced from fingers 34,36 by a sufficient distance to trap the housing 24 between them. If a force is applied which tends to separate the coupling, bead 22 bears against fingers 30,32 and housing 24 bears against fingers 34,36 such that retainer 20 prevents separation of the coupling components.

Figure 2:
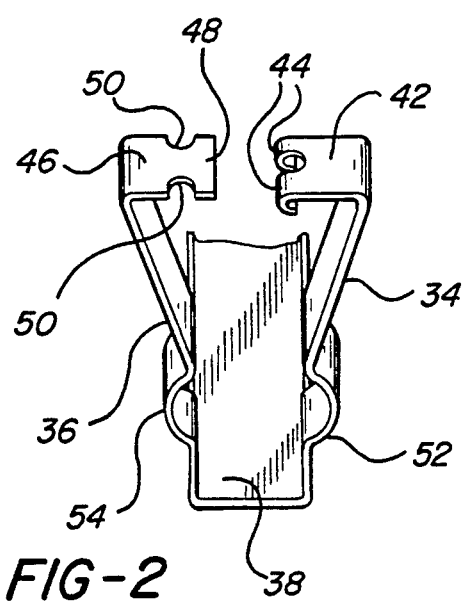
FIG. 2 is a perspective detail of the retainer from the FIG. 1 assembly illustrating the self-aiming, one-way latch mechanism.
Figure 4:
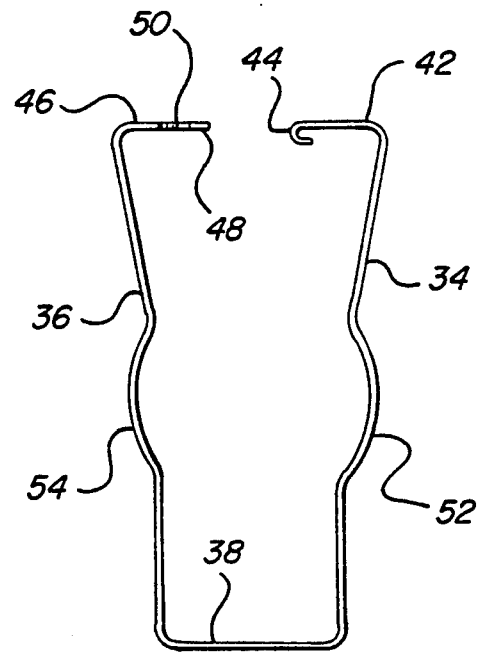
FIG. 4 is an end view of the inventive retainer.
Figure 5:
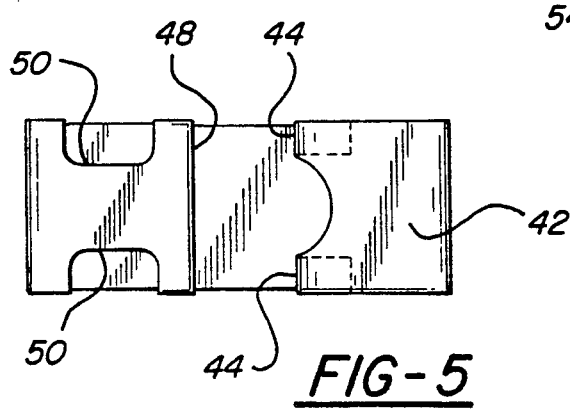
FIG. 5 is a plan view of the retainer in an open, unlatched condition.

Looking now to FIG. 2, the details of the upper ends of the fingers 34 and 36 are configured to provide a self-aiming, one-way latch mechanism which is quickly and easily operated to tie the ends of the fingers 34 and 36 together when the retainer 20 is assembled to the female coupling 18. The entire retainer 20 is made of spring steel by forming, bending and hardening a blank. In the forming process, the extended finger 34 is bent at approximately right angles about ¼ inch from the end to provide the transverse latching portion 42 which, in turn, is configured to provide a pair of parallel spaced apart tangs 44 separated by a saddle-shaped void as shown. Moreover, the tangs 44 are turned back and inwardly to form a radiussed inner end surface, the function of which is hereinafter described.

The extended finger 36 is also bent near the upper end to provide a transverse portion 46 which opposes but extends toward the transverse portion 42 of finger 34. Finger 36 is formed near the end thereof into a T-shaped head 48 which is effectively the complement of the tanged portion 44 of transverse portion 42 so as to complete the self-aiming, one-way latch herein described. The cross bar of T-shaped head 48 extends the full width of the finger 44 and is defined by cutouts 50 which also form the vertical portion of the "T" as shown. When finally formed, the inner end of T-head 48 is aimed just below the center of the radius of tangs 44 for purposes hereinafter explained.

Fingers 34 and 36 are radiussed near the bridge 38 to provide portions 52 and 54 which afford a stable clamping area to receive and hold the small diameter section 26 of fuel line 16 as hereinafter described. Fingers 30 and 32 are radiussed at 56,58 to grasp the male coupling component 14 in a stable clamping relationship.

Looking now to FIGS. 3 through 9, the operation of the self-aiming, one-way latch will be described.

Figure 6:
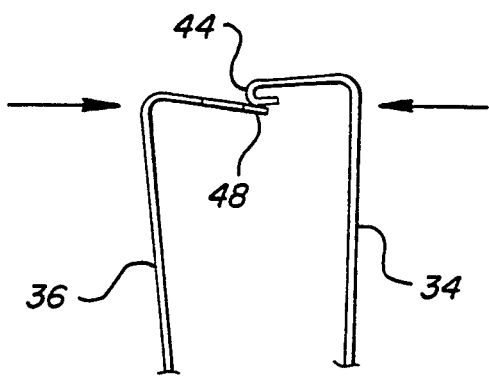
FIG. 6 is an end view of the retainer showing the relationship between latch elements during the latching process.
Figure 7:
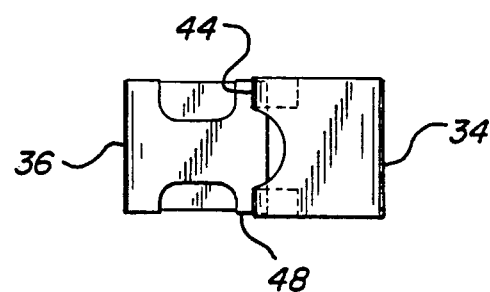
FIG. 7 is a plan view of the retainer in an condition which corresponds to FIG. 6.
Figure 8:
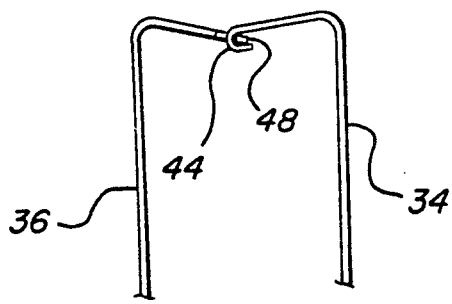
FIG. 8 is an end view of the retainer in the latched condition.
Figure 9:
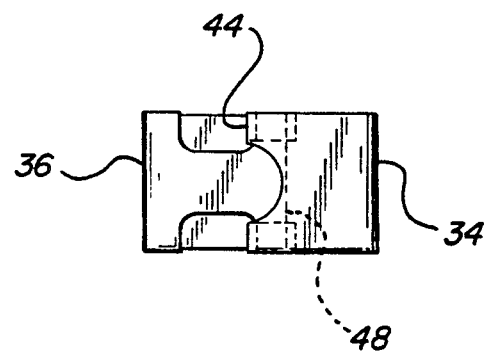
FIG. 9 is a plan of the retainer in a condition which corresponds to that of FIG. 8.

Fingers 34 and 36 are initially separated from one another by a sufficient distance to permit the retainer to be attached loosely to the female coupling component at 26. Thereafter, when the fingers 34 and 36 are urged toward one another by opposing inwardly directed forces F as shown in FIG. 6, the end surface of the T-shaped head 48 engages the radiussed opposed external surfaces of the tangs 44 and begins to ride downwardly and inwardly over the surfaces of the tangs 44 in the manner of a follower riding on a cam. As shown in FIGS. 8 and 9, further application of the inwardly directed opposed forces F results in the T-shaped head 48 clearing past the inner ends of the tangs 48 and, thereafter, transverse portion 46 of finger 36 snaps upwardly so that the T-shaped head 48 fits in behind the tangs 44. Although the compliant forces in the spring fingers 34 and 36 tend to urge the fingers away from one another, the crossbar of the T head 48 is securely locked behind the tangs 44.

Figure 3:
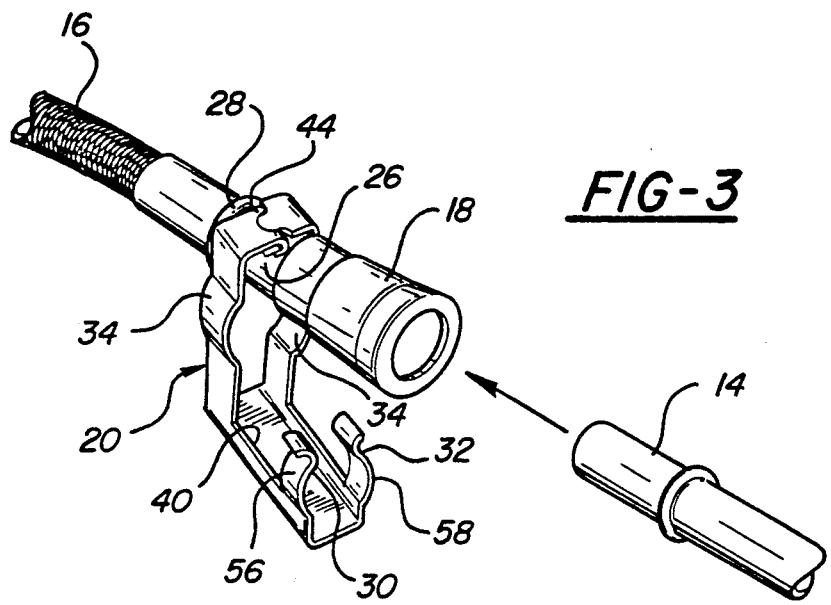
FIG. 3 is a perspective view of the retainer applied to one component of a coupling.

A typical industrial application of the retainer 20 will now be described with particular reference to FIGS. 1 and 3.

Assume for purposes of explanation that the fuel line 16 is assembled by one automotive supplier and the filter 12 is provided by another supplier. Assume further that the fuel line 16 and the filter 12 are assembled and shipped to a common assembly point as separate packages. The retainer 20 is assembled by supplier No. 1 to the fuel line 16 as shown in FIG. 3 so that it will be on the fuel line subassembly when the two components 12 and 16 later are brought together. For this purpose, the fingers 34 and 36 are separated from one another to receive the small diameter portion 26 of the fuel line subassembly 16 therebetween. The fingers 34 and 36 are then urged toward one another to close and lock the fingers together in the manner described above with reference to FIGS. 6 through 9. At this point in time, the small diameter section 26 of the fuel line subassembly is disposed between the upper ends of the fingers 34 and 36; i.e., the small diameter fuel line portion 26 has not yet been urged downwardly into the radiussed portions 52 and 54 of the fingers. The longitudinally spaced set of fingers 30 and 32 is located out in front of the female coupling 18 and is not yet attached to the fuel filter portion 14.

When the coupling between male fuel filter component 14 and the female coupling 18 is made, the male portion 14 is urged into the female portion 18 until the flange or bead 22 is well down inside of the bell-shaped housing 24. The retainer 20 is then pushed laterally toward the fuel line elements 14 and 26, element 14 being received between the fingers 30 and 32 and the retainer being urged further until element 14 lies between the radiussed stable grasping portions 56 and 58 of fingers 30 and 32, respectively. Simultaneously, the small diameter portion 26 of the fuel line subassembly 16 is brought downwardly into the radiussed portions 52 and 54 of the fingers 34 and 36. The clip is now in position and operates against the abutting surfaces of the housing 18 and the flange 22 to prevent the coupled components from being pulled apart. At the same time, it is possible to relatively easily pull the clip out of its operative position in the event replacement of the fuel filter 12 or servicing of some other component in the fuel line is desired. The retainer 20 can be reused many times.

It will be appreciated the self-aiming, one-way latch mechanism illustrated in FIG. 2 can be achieved through configurations other than that shown in FIG. 2. For example, the tangs 44 can be bent upwardly rather than downwardly; however, the downwardly-bent embodiment shown in FIG. 2 is believed to be optimum from the standpoint of user friendliness. Alternatively, a single turned back tang can operate in conjunction with an aperture formed near the end of the opposing finger 36. Once again the self-aiming feature of a radiussed surface on one of the finger ends and a cam follower surface on the other finger end would be provided. Still other arrangements may occur to those skilled in the mechanical arts.

The material of construction of the retainer 20 is preferably 410 stainless steel which has been heat treated after forming for hardness and spring compliance. Alternative metals and even reinforced and unreinforced plastics can also be used.

We claim:

1. A clip-on retainer of the type used to secure a telescopic coupling between male and female components, said retainer comprising:
    a first clip portion made up of first and second opposed compliant fingers adapted to receive and grasp the male component therebetween;
    a second clip portion made up of third and fourth opposed compliant fingers adapted to receive and grasp the female component therebetween; and
    a bridge between the first and second clip portions to space said clip portions longitudinally along the coupling by a distance which is sufficient to receive said coupling therebetween;
    wherein the improvement comprises a self-aiming, one-way latch means for selectively securing the ends of the third and fourth fingers to one another.

2. A clip-on retainer as described in claim 1 wherein each of the first and second fingers is conformed to define a stable position for said male portion and each of the third and fourth fingers is conformed to define a stable position for the female coupling component therebetween.

3. A clip-on retainer of the type used to secure a telescopic coupling between male and female components, said retainer comprising:
    a first clip portion made up of first and second opposed compliant fingers adapted to receive and grasp the male component therebetween;
    a second clip portion made up of third and fourth opposed compliant fingers adapted to receive and grasp the female component therebetween; and
    a bridge between the first and second clip portions to space said clip portions longitudinally along the coupling by a distance which is sufficient to receive said coupling therebetween;
    wherein the improvement comprises a self-aiming, one-way latch means for selectively securing the ends of the third and fourth fingers to one another;
    said self-aiming, one-way latch comprises a pair of tangs formed on the ends of the third finger, said tangs being turned back on said finger to form a hook area, and a T head formed on the end of the fourth finger, the T head being oriented such that opposing forces tending to urge the third and fourth fingers together causes the T head to cam along the exterior surfaces of the tangs until clear of the tangs and thereafter to snap in behind the tangs to latch the ends of the third and fourth fingers together.

4. A method of providing a degree of redundancy in the security of a telescopic fluid coupling comprising the steps of:
    1) locating a pair of opposed compliant spring clip fingers around a small diameter portion of one of the coupling components by separating the fingers to receive the small diameter portion and thereafter urging the fingers toward one another;
    2) latching the fingers to one another by means of a self-aiming, one-way latch mechanism formed on the ends of the fingers;
    3) completing the telescopic coupling; and, thereafter,
    4) urging a second set of opposed compliant fingers formed integrally with the retainer clip and spaced longitudinally from the first and second fingers into opposed grasping engagement with the small diameter portion of the other of said coupling components to effectively bridge the coupling and provide interfering mechanical mechanisms for opposing the separation of said components.

* * * * *